(12) United States Patent
Deneka et al.

(10) Patent No.: US 11,584,673 B2
(45) Date of Patent: Feb. 21, 2023

(54) LAMINATE ARTICLE HAVING A NON-GLASS CORE AND GLASS ENVELOPE AND METHODS THEREOF

(71) Applicant: Corning Incorporated, Corning, NY (US)

(72) Inventors: David Alan Deneka, Corning, NY (US); Lisa Ann Lamberson, Painted Post, NY (US); Thomas Matthew Sonner, Corning, NY (US); Paul Arthur Tick, Corning, NY (US); Derek M Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 16/635,446

(22) PCT Filed: Jul. 30, 2018

(86) PCT No.: PCT/US2018/044360
§ 371 (c)(1),
(2) Date: Jan. 30, 2020

(87) PCT Pub. No.: WO2019/027893
PCT Pub. Date: Feb. 7, 2019

(65) Prior Publication Data
US 2021/0087096 A1 Mar. 25, 2021

Related U.S. Application Data

(60) Provisional application No. 62/574,433, filed on Oct. 19, 2017, provisional application No. 62/539,124, filed on Jul. 31, 2017.

(51) Int. Cl.
*C03B 17/06* (2006.01)
*B32B 7/027* (2019.01)
(Continued)

(52) U.S. Cl.
CPC ............ *C03B 17/064* (2013.01); *B32B 7/027* (2019.01); *B32B 17/06* (2013.01); *C03B 17/02* (2013.01);
(Continued)

(58) Field of Classification Search
None
See application file for complete search history.

(56) References Cited

U.S. PATENT DOCUMENTS 1,548,444 A * 8/1925 Corl ...................... C03B 17/061
65/374.13
3,113,878 A * 12/1963 Martin ...................... H01J 5/20
501/15
(Continued)

FOREIGN PATENT DOCUMENTS

CN 104918782 A 9/2015
EP 0638939 A2 2/1995
(Continued)

OTHER PUBLICATIONS

Chinese Patent Application No. 201880050281.8, Office Action dated Dec. 31, 2021, 18 pages (11 pages of English Translation and 7 pages of Original Document), Chinese Patent Office.
(Continued)

*Primary Examiner* — Jodi C Franklin
(74) *Attorney, Agent, or Firm* — Russell Magaziner

(57) ABSTRACT

A laminate sheet article including: a core including an electrical semi-conductor or an electrical conductor; and a continuous glass clad layer on at least four of six sides the core of the sheet article. Also disclosed is an apparatus for making a sheet laminate article as defined herein. Also disclosed is a method of making and using the article.

10 Claims, 7 Drawing Sheets

(51) Int. Cl.
  *B32B 17/06* (2006.01)
  *C03C 3/078* (2006.01)
  *C03C 3/091* (2006.01)
  *C03C 3/097* (2006.01)
  *C03C 3/11* (2006.01)
  *C03B 17/02* (2006.01)

(52) U.S. Cl.
  CPC .............. *C03C 3/078* (2013.01); *C03C 3/091* (2013.01); *C03C 3/097* (2013.01); *C03C 3/11* (2013.01)

(56) References Cited

U.S. PATENT DOCUMENTS

| | | | | |
|---|---|---|---|---|
| 3,241,010 A * | 3/1966 | Eddleston | ............ | H01L 23/291 428/428 |
| 3,363,150 A * | 1/1968 | Willis | ................... | H01L 25/074 257/712 |
| 3,392,312 A * | 7/1968 | Carman | ................ | H01L 21/316 65/DIG. 11 |
| 3,441,422 A * | 4/1969 | Graff | ..................... | H01L 23/051 257/E21.271 |
| 3,497,338 A | 2/1970 | Yukihiro et al. | | |
| 3,505,571 A * | 4/1970 | Volder | .................. | H01L 21/316 501/78 |
| 3,810,744 A | 5/1974 | Dumbaugh et al. | | |
| 3,900,330 A * | 8/1975 | Moriguchi | ................ | C03C 4/00 257/E21.271 |
| 3,913,127 A * | 10/1975 | Suzuki | .................. | H01L 25/074 257/694 |
| 3,931,438 A | 1/1976 | Beall et al. | | |
| 3,996,602 A * | 12/1976 | Goldberg | ............ | H01L 23/3135 257/793 |
| 4,059,837 A * | 11/1977 | Suzuki | .................. | H01L 23/051 257/E23.118 |
| 4,153,910 A * | 5/1979 | Itoh | ....................... | H01L 23/492 257/E23.126 |
| 4,214,886 A | 7/1980 | Shay et al. | | |
| 4,260,095 A | 4/1981 | Smith | | |
| 4,405,672 A | 9/1983 | Araujo et al. | | |
| 4,430,664 A * | 2/1984 | Matsunaga | ........... | H01L 23/291 65/53 |
| 4,897,100 A | 1/1990 | Nice | | |
| 4,987,476 A * | 1/1991 | Korwin-Pawlowski | ..................... | H01L 24/01 257/785 |
| 5,106,400 A * | 4/1992 | Tick | .................. | C03B 37/01268 65/502 |
| 5,500,056 A | 3/1996 | Wada et al. | | |
| 6,200,137 B1 | 3/2001 | Holand | .................. | A61K 6/816 501/3 |
| 6,280,863 B1 * | 8/2001 | Frank | ..................... | A61K 6/807 106/35 |
| 6,309,901 B1 | 10/2001 | Tahon et al. | | |
| 6,327,994 B1 * | 12/2001 | Labrador | ................ | B63B 39/06 114/382 |
| 6,588,235 B2 | 7/2003 | Trentelman et al. | | |
| 9,061,934 B2 * | 6/2015 | Bisson | ................ | C03B 23/0258 |
| 9,902,138 B2 * | 2/2018 | Edwards | ................. | C03B 17/02 |
| 10,286,630 B2 * | 5/2019 | Boek | ........................ | B32B 3/08 |
| 11,347,829 B1 * | 5/2022 | Sclar | ...................... | G06F 19/328 |
| 11,412,707 B1 * | 8/2022 | Garcia | .................. | A01K 5/0225 |
| 2003/0013280 A1 * | 1/2003 | Yamanaka | ........ | H01L 21/02598 257/E29.294 |
| 2003/0044143 A1 * | 3/2003 | Trentelman | .............. | G02B 6/02 65/405 |
| 2004/0093900 A1 * | 5/2004 | Fredholm | ............. | C03B 17/064 65/44 |
| 2004/0197575 A1 * | 10/2004 | Bocko | .................. | C03B 17/062 428/432 |
| 2006/0016219 A1 * | 1/2006 | Pitbladdo | .............. | G01F 1/6888 65/29.21 |
| 2008/0092804 A1 | 4/2008 | Hansen et al. | | |
| 2012/0052656 A1 * | 3/2012 | Bellman | ............ | H01L 21/2257 257/E21.321 |
| 2014/0141217 A1 * | 5/2014 | Gulati | ..................... | C03B 23/20 428/375 |
| 2014/0238078 A1 | 8/2014 | Boek et al. | | |
| 2014/0318578 A1 * | 10/2014 | Enicks | .............. | H01L 21/02041 134/15 |
| 2015/0224744 A1 * | 8/2015 | Neuhaeusler | ........... | C03B 17/06 53/435 |
| 2015/0284282 A1 | 10/2015 | Godard et al. | | |
| 2016/0023448 A1 * | 1/2016 | Bookbinder | ............ | C03C 3/091 156/510 |
| 2016/0083282 A1 | 3/2016 | Jouanno et al. | | |
| 2017/0246841 A1 * | 8/2017 | Chaparala | ............. | C03B 17/064 |
| 2017/0297948 A1 * | 10/2017 | Bowden | ...................... | C03B 5/16 |
| 2017/0334773 A1 * | 11/2017 | Katayama | ................ | B32B 7/06 |
| 2019/0181496 A1 * | 6/2019 | Visco | ................ | H01M 10/0562 |
| 2021/0269347 A1 * | 9/2021 | Zimmer | ............... | C03B 17/067 |
| 2022/0263277 A1 * | 8/2022 | Mathias | ............. | H01R 13/5221 |

FOREIGN PATENT DOCUMENTS

| | | |
|---|---|---|
| JP | 2002001492 A | 1/2002 |
| JP | 2002003981 A | 1/2002 |
| JP | 2003221284 A | 8/2003 |
| JP | 2008025020 A | 2/2008 |
| JP | 2009288008 A | 12/2009 |
| RU | 2505495 C1 | 1/2014 |

OTHER PUBLICATIONS

International Search Report and Written Opinion of the International Searching Authority; PCT/US2018/044360; dated Oct. 12, 2018; 10 Pages; ISA/US Commissioner for Patents.

* cited by examiner

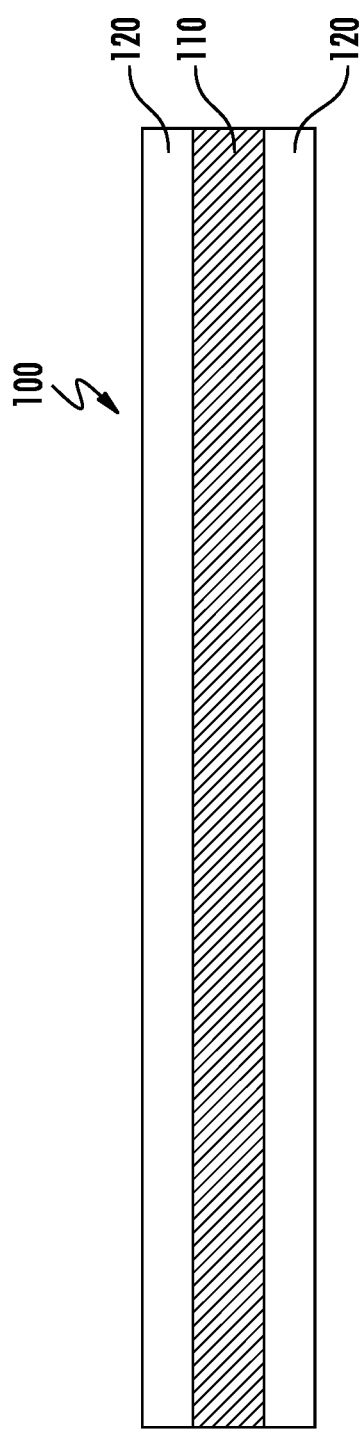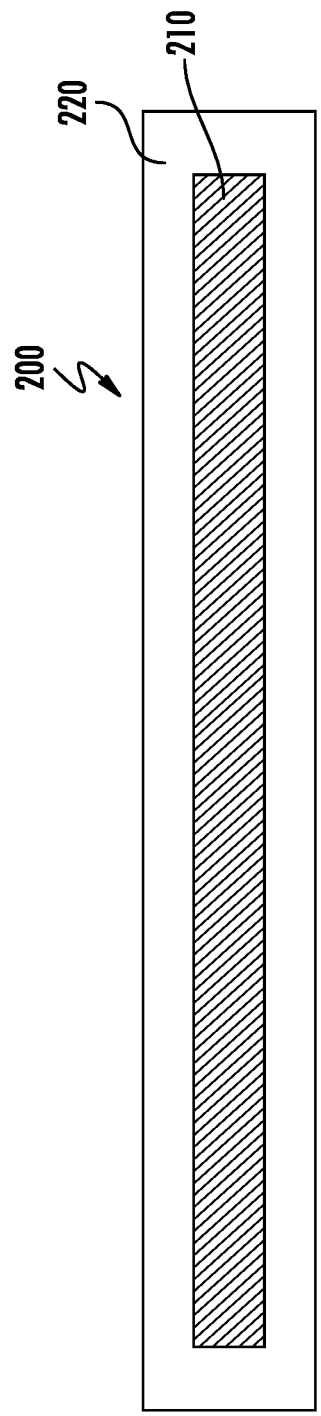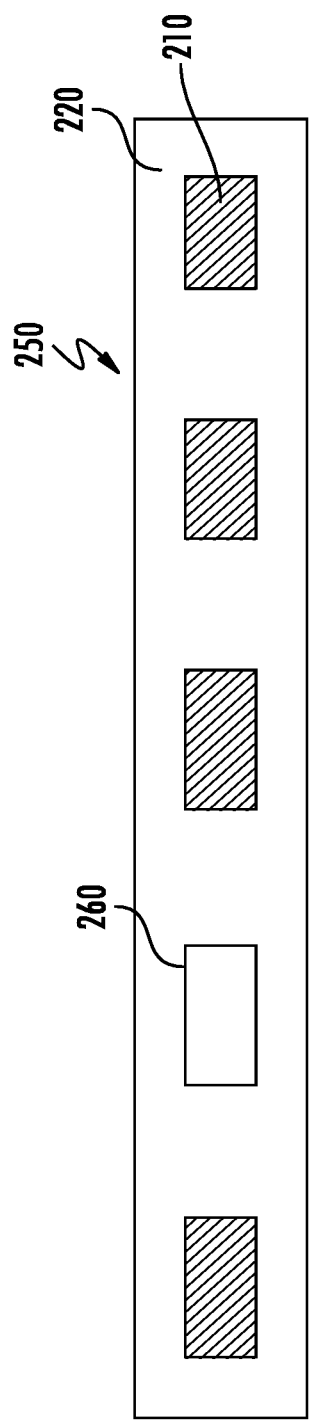

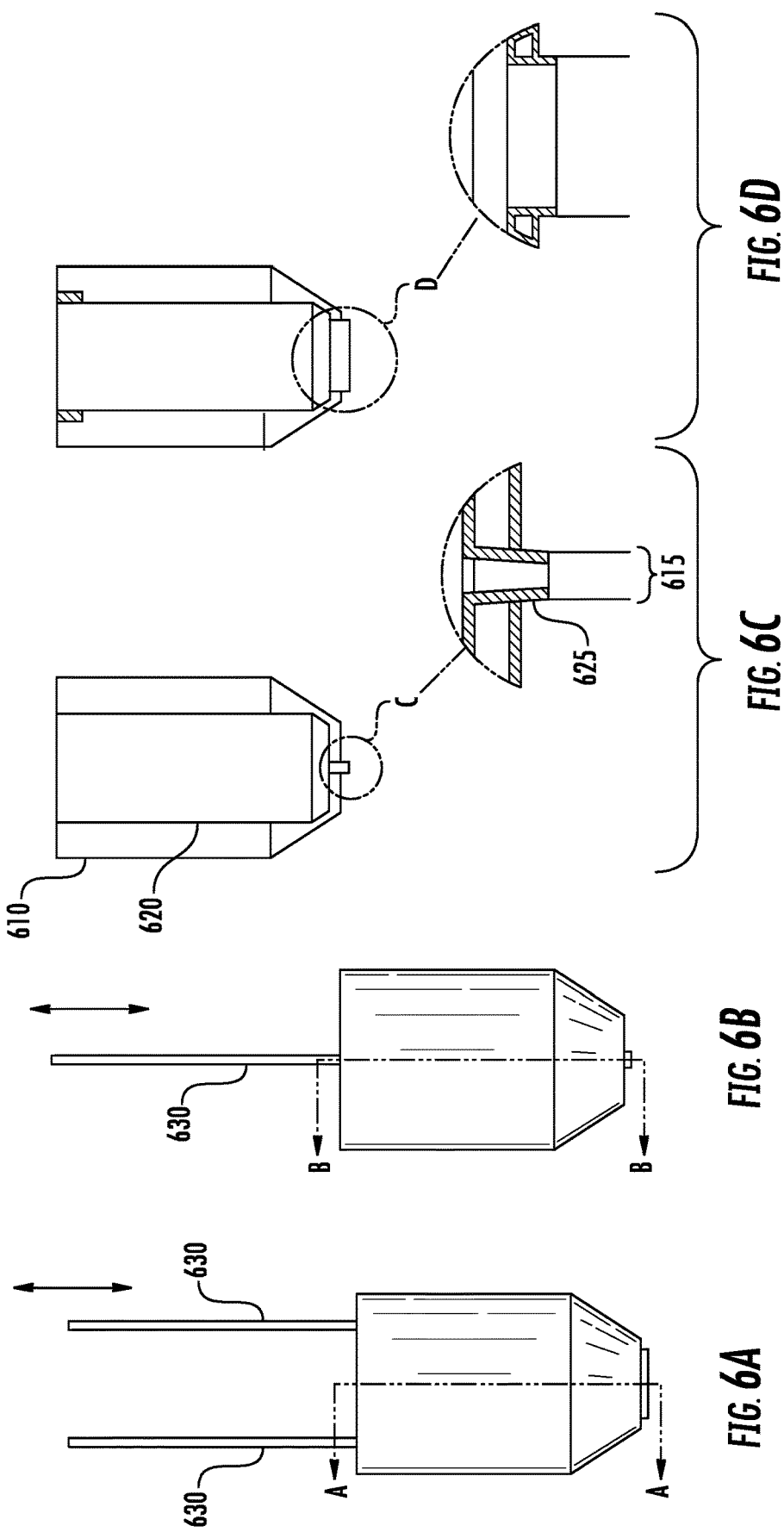

LAMINATE ARTICLE HAVING A NON-GLASS CORE AND GLASS ENVELOPE AND METHODS THEREOF

CROSS-REFERENCE TO RELATED APPLICATIONS

The present application claims the benefit of priority under 35 U.S.C. § 371 of International Application Serial No. PCT/US2018/044360, filed on Jul. 30, 2018, which, in turn, claims the benefit of priority under 35 U.S.C. § 119 to U.S. Provisional Patent Application No. 62/539,124, filed on Jul. 31, 2017,_ and to U.S. Provisional Patent Application No. 62/574,433, filed on Oct. 19, 2017, the contents of all of which are relied upon and incorporated herein by reference in their entirety.

This application is related to commonly owned and assigned U.S. Pat. No. 7,514,149, issued on Apr. 7, 2009 to Bockco et al. and titled "High-strength laminated sheet for optical applications," and U.S. Pat. No. 8,007,913, issued on Aug. 30, 2011 to Coppola et al. and titled "Laminated Glass Articles and Methods of Making Thereof," U.S. patent application Ser. No. 13/479,701, filed on May 24, 2012 to Coppola et al. and titled "Apparatus and Method for Control of Glass Streams in Laminate Fusion," and U.S. Provisional Patent Application Nos. 61/676,028, filed on Jul. 26, 2012 to Kersting et al. and titled "Refractory Liner Structure and Use in Glass Fusion Draw," and 61/678,218, now U.S. patent application Ser. No. 14/905,926, filed on Jan. 18, 2016 to Coppola et al. and titled "Method and Apparatus for Laminate Fusion," the contents of which are relied upon and incorporated herein by reference in their entirety.

The entire disclosure of each publication or patent document mentioned herein is incorporated by reference.

BACKGROUND

The disclosure relates to a laminate article having a non-glass core and a glass envelope around the non-glass core and methods thereof, i.e., laminate sheet articles including a non-glass core and a glass clad surround.

SUMMARY

In embodiments, the disclosure provides an apparatus for making a fully enveloped laminate sheet article having a non-glass core layer and at least one glass clad layer surrounding the non-glass core layer.

In embodiments, the disclosure provides an improved double crucible apparatus and method of making a fully glass enveloped, laminate sheet article having one or a plurality of non-glass cores and at least one glass clad layer surrounding the one or the plurality of non-glass cores.

In embodiments, the disclosure provides a method for making a laminate sheet article comprising a slot draw portion for producing a non-glass core layer and a fusion draw portion for producing a glass clad envelope surrounding the non-glass core layer.

In embodiments, the disclosure provides an article having a non-glass core layer and a glass clad envelope surrounding the non-glass core layer.

In embodiments, the non-glass core layer can be, for example, a semiconductor and the glass clad envelope surrounding the non-glass core layer can be, for example, a low melting glass or glass ceramic.

In some embodiments, a laminate sheet article comprises a core layer comprising an electrical semi-conductor or an electrical conductor; and a glass clad layer envelope surrounding, in cross-section, the major faces and at least two edges of the core.

In some implementations, which is combinable with any of the other aspects or embodiments, the core layer and the clad layer have a coefficient of thermal expansion (CTE) difference of less than from $\pm 5 \times 10^{-7}/°$ C.

In some implementation, which is combinable with any of the other aspects or embodiments, an exterior of the major faces of the glass clad are pristine.

In some implementation, which is combinable with any of the other aspects or embodiments, the core layer is at least one of Si, Ge, GaAs, or a mixture thereof, and has a melt viscosity of from 0.01 poise to 100 poise; and the glass clad layer surrounding the core comprises a glass having a melt viscosity of from 30,000 poise to 400,000 poise, and has a CTE compatible with the core material.

In some implementation, which is combinable with any of the other aspects or embodiments, the core layer has a thickness of from 0.1 microns to 100 millimeters and a width of from 0.09 microns to 9.99 meters; and the glass clad layer surrounding the core has a layer thickness of from 0.1 microns to 1,000 microns, and a layer width of from 0.1 mm to 10 meters.

In some implementation, which is combinable with any of the other aspects or embodiments, a glass core comprising a halide glass, an oxyhalide glass, a chalcogenide glass, or a mixture thereof; and an enveloping glass clad layer on each major face of the core and at least two ends or edges of the sheet article.

In some implementation, which is combinable with any of the other aspects or embodiments, the glass core and the enveloping glass clad layer has a melting point difference of from 0° C. to about 400° C.

In some implementation, which is combinable with any of the other aspects or embodiments, a lamination apparatus for making an article described herein comprises: a first crucible that extrudes a sheet of the core layer; and a second crucible surrounding the first crucible that delivers a glass envelope layer to each face and at least two edges of the sheet of the core layer to produce the laminate sheet article, wherein the relative height of at least one or both of the first crucible and second crucible is vertically adjustable with respect to the other crucible.

In some implementation, which is combinable with any of the other aspects or embodiments, the vertically adjustability of the relative height of the at least one or both of the first crucible and second crucible regulates relative flow and relative thickness, width, or both of the core layer, and relative flow and relative thickness of the glass envelope layer.

In some implementation, which is combinable with any of the other aspects or embodiments, the first crucible, the second crucible, or both crucibles, comprise platinum; and the first crucible, the second crucible, or both crucibles, comprise an erosion protective quartz surface coating.

In some implementation, which is combinable with any of the other aspects or embodiments, the lamination apparatus further comprises a cooling wand, a cooling roller, a cooling fluid jet, or a combination thereof, situated on one or both of the major faces of the resulting laminate sheet article.

In some implementation, which is combinable with any of the other aspects or embodiments, a method of making a continuous laminate sheet, the sheet comprising: a core comprising at least one of an electrical semiconductor material, an electrical conductor material, or a combination thereof; and a clad layer comprising a glass surrounding at least four of six sides of the core; the method comprises: continuously slot extruding a sheet of the core and simultaneously and continuously fusion drawing the glass clad layer onto at least four of six sides including both major sides of the core sheet to produce the continuous laminate sheet having an envelope structure.

In some implementation, which is combinable with any of the other aspects or embodiments, the method further comprises: zone refining the continuous laminate sheet to enhance crystallinity of the core.

In some implementation, which is combinable with any of the other aspects or embodiments, the method further comprises: rolling the continuous laminate sheet into a roll, or cutting the continuous laminate sheet into individual sheets.

In some implementation, which is combinable with any of the other aspects or embodiments, slot extruding is accomplished in a vacuum, in an inert atmosphere, under positive pressure, or a combination thereof.

In some implementation, which is combinable with any of the other aspects or embodiments, the core comprises at least one of Si, Ge, GaAs, or a mixture thereof, and has a viscosity of from 0.01 centipoise to 5,000 centipoise; and the glass clad layer surrounding the core has a viscosity of from 30,000 poise to 400,000 poise, and a CTE compatible with the core material.

In some implementation, which is combinable with any of the other aspects or embodiments, the core has a thickness of from 0.1 microns to 100 millimeters and a width of from 0.09 mm to 9.99 meters; and the glass clad layer surrounding the core has a thickness of from 0.1 to 1,000 microns, and a width of from 0.1 mm to 10 meters.

In some implementation, which is combinable with any of the other aspects or embodiments, slot extruding is accomplished above the melting point of the core; and fusion drawing is accomplished above the melting point of the glass.

In some implementation, which is combinable with any of the other aspects or embodiments, a width of the glass clad layer is greater than a width of the core.

In some implementation, which is combinable with any of the other aspects or embodiments, the glass clad layer is an envelope completely surrounding the core on both major faces and on at least one edge or end.

In some implementation, which is combinable with any of the other aspects or embodiments, the glass clad layer is an envelope completely surrounding the core on both major faces and on all edges and ends.

BRIEF DESCRIPTION OF THE DRAWINGS

In embodiments of the disclosure:

FIG. 1 shows a schematic in cross-section of an example PRIOR ART laminate structure (100) produced in a double fusion laminating apparatus having a core (110) and a clad (120) on each face of the core.

FIGS. 2A and 2B show schematics in cross-section of examples of the disclosed slot drawn-fusion sheets or laminate envelope structures.

FIGS. 6A to 6D show views of the disclosed vertically adjustable double crucible slot draw perspective schematic of FIG. 5.

DETAILED DESCRIPTION

Figure 3:
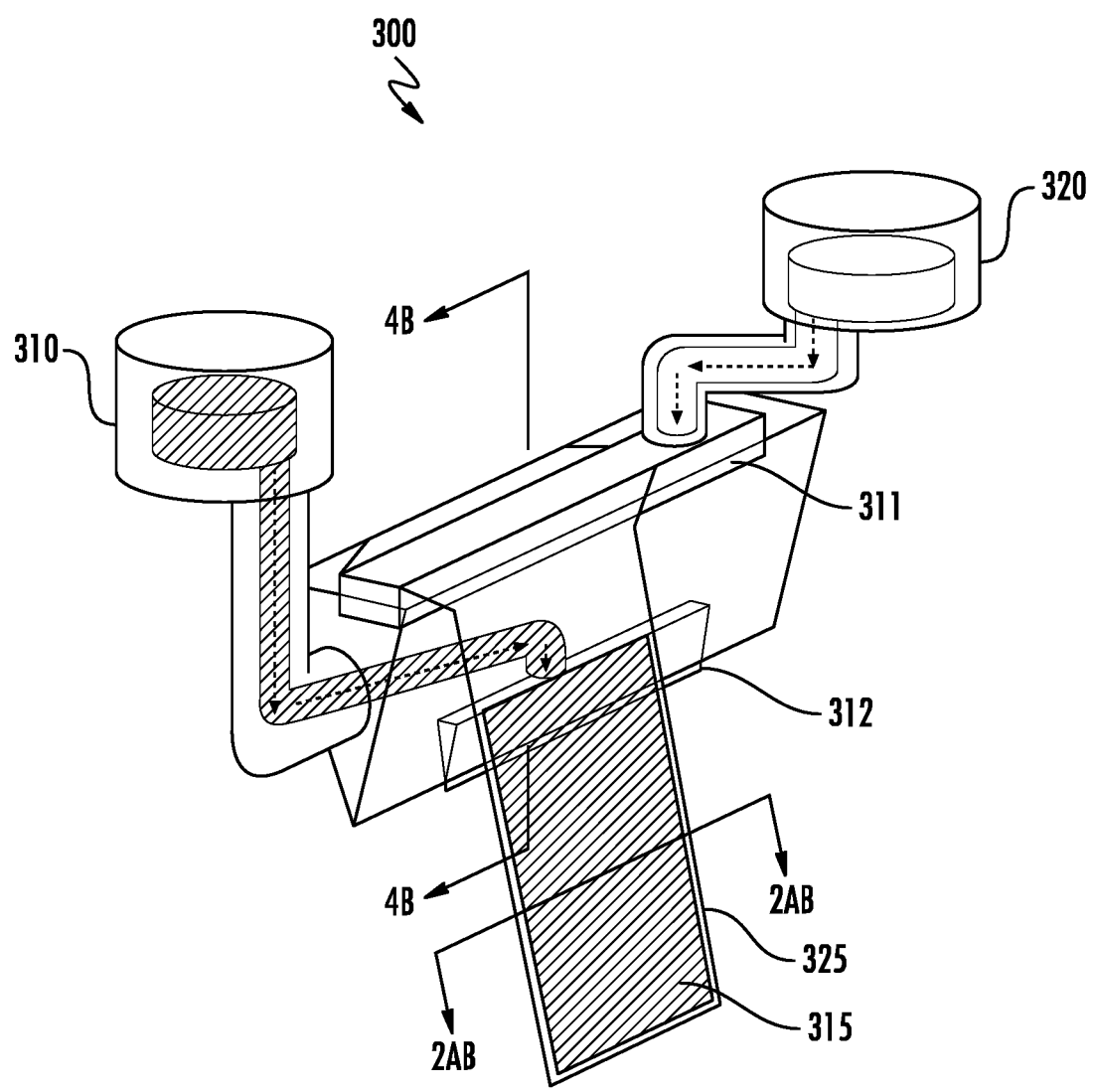
FIG. 3 shows a schematic in perspective of an example a combined slot draw and fusion draw apparatus of the disclosure.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Include," "includes," or like terms means encompassing but not limited to, that is, inclusive and not exclusive.

"About" modifying, for example, the quantity of an ingredient in a composition, article, or apparatus, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The apparatus, articles, and methods of the disclosure can include any value or any combination of the values, specific values, more specific values, and preferred values described herein, including explicit or implicit intermediate values and ranges.

Documents of interest include, for example:

The above mentioned commonly owned U.S. Pat. No. 7,514,149, entitled "High-strength laminated sheet for optical applications, mentions at cols. 13 to 14, a combination fusion and slot draw apparatus, see also FIGS. 15 and 16.

Figure 4B:
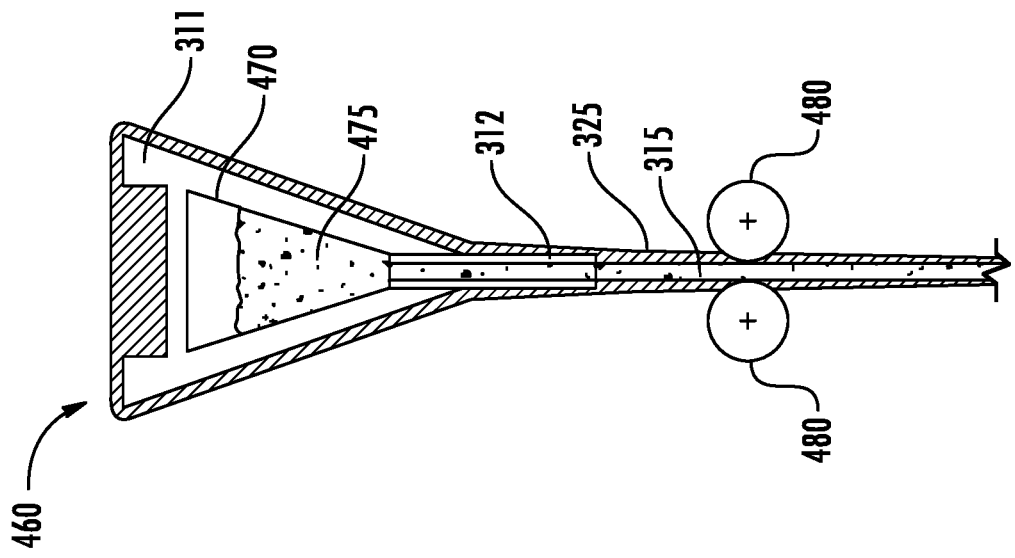
FIGS. 4A and 4B shows the cross-sections of a PRIOR ART double fusion apparatus (4A) and the PRIOR ART apparatus schematic of FIG. 3 (4B).
Figure 4A:
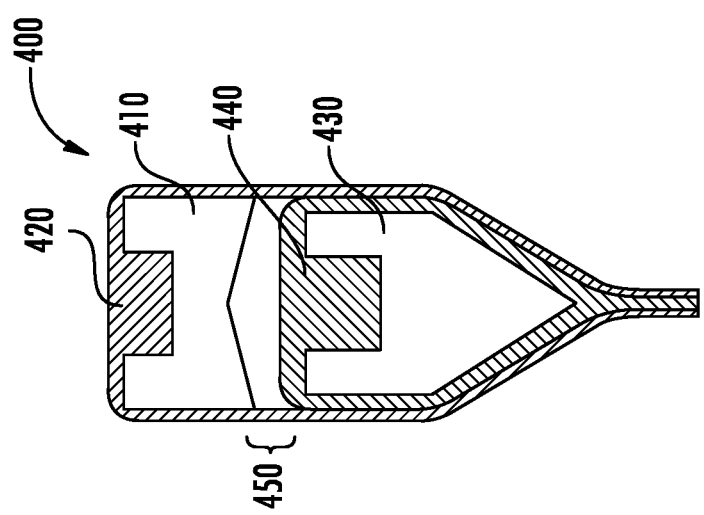

JP2002003981A, entitled "Apparatus for manufacturing of laminated amorphous composite material by rapid solidification" shows an apparent double crucible apparatus for producing either a cylindrical or sheet product having a non-glass core and a glass clad layer on the core, where 22 is the core and 21 and 23 are the glass clad layers at least in FIG. 4(a) therein.

U.S. Pat. No. 6,309,901, mentions glass laminates in semiconductor devices comprising a non-glass support such as paper or metal between two glass layers, with or without an adhesive layer (see col. 4).

U.S. Pat. No. 5,106,400, to Tick, mentions an apparatus and method of forming a glass preform from core and cladding glasses having low liquidus viscosities and narrow working ranges. The apparatus and method can prevent mixing of the liquid core and clad composite.

U.S. Pat. No. 4,897,100, mentions an apparatus and process for fiberizing clad and core fluoride glasses using a double crucible and the compositions produced.

Silicon based electronic components or articles can be made, for example, almost exclusively in a conventional planar wafer format. The planar wafer format can be used for the production of various junction-based architectures. In contrast, a vertical wafer format is less common. If a vertical architecture could be scaled and readily implemented, such a process could provide an advantaged route to produce semiconductor based devices.

The Corelle™ process pioneered by Corning, Inc., has produced laminate sheets having some extraordinary strength properties. More recently, Corning, Inc., has produced glass core and glass clad laminates by a double fusion draw apparatus having two fusion pipes. However, using two fusion pipes can have a drawback because both the core (interior glass) and clad (exterior glass) have to be fusion compatible. So that only glasses typically having a liquidus viscosities, for example, above 200,000 poises work satisfactorily in the double fusion draw apparatus.

In embodiments, the disclosure provides an apparatus for making a laminate sheet or laminate article having a semiconductive core and a glass clad that envelopes or surrounds the core.

In embodiments, the disclosure provides a method of making a continuous laminate sheet, the sheet comprising: a core comprising at least one of an electrical semiconductor material, an electrical conductor material, or a combination thereof; and a clad layer comprising a glass surrounding at least four sides, five sides, or all six sides of the core, i.e., the entire core;

the method comprising: continuously slot extruding a sheet of the core and simultaneously and continuously fusion drawing glass clad layers onto each of the major faces or major sides and each of the minor edges of the core sheet to produce the continuous laminate sheet having an envelope structure.

In embodiments, the method can further comprise zone refining the continuous laminate sheet to enhance the crystallinity of the core, for example, to produce a single crystalline semi-conductive core.

In embodiments, the method can further comprise rolling the continuous laminate sheet into a roll, or cutting the continuous sheet into individual sheets or sections.

In embodiments, simultaneously extruding and drawing can be accomplished, for example, in a vacuum, under pressure, in an inert atmosphere, or combinations thereof.

In embodiments, the core can comprise at least one of Si, Ge, GaAs, or a mixture thereof, and has a viscosity of from 0.01 to 5,000 centipoise, for example, of from 0.5 to 1,000 centipoise, 1 to 500 centipoise, 10 to 100 centipoise, and like viscosities, including intermediate values and ranges; and the glass clad layer surrounding the core can comprise, for example, a glass having a viscosity of from 30,000 to 400,000 poise, for example, 10,000 to 100,000 poise, 10,000 to 50,000 poise, and a CTE that is compatible, that is, from about plus or minus 10% relative difference in CTE with the core material.

In embodiments, the core can have a thickness of, for example, from 20 microns to 10 mm and a width of from 0.1 mm to 10 meters, including intermediate values and ranges; and the glass clad layer surrounding the core can have a thickness and a width greater than the core of, for example, a thickness of from 50 to 1,000 microns, and a width of from 0.1 mm to 10 meters, including intermediate values and ranges.

In embodiments, the slot extruding of the core can be accomplished, for example, above the melting point of the core such as from 50 to 200° C. above; and the fusion drawing of the glass clad can be accomplished, for example, above the melting point of the glass such as from 50 to 100° C. above.

In embodiments, the glass cladding is wider than the width of the core layer.

In embodiments, the glass cladding can be, for example, an envelope that completely surrounds the core layer.

In embodiments, the disclosure provides a laminate sheet article comprising:
  a core comprising an electrical semi-conductor or an electrical conductor; and
  a glass clad layer on each face of the core and the ends of the sheet article, that is, the glass clad layers completely surrounds the core on all faces and all sides.

In embodiments, the core and the clad layer can have a CTE difference of less than from about $\pm 5 \times 10^{-7}$.

In embodiments, the core and the glass clad layer can have a melting point difference of from 0 to about 400° C.

In embodiments, the exterior glass envelop surfaces of the article are pristine, that is, free of defects, free of contaminants, very flat, very smooth, very small or negligible surface roughness, for example, as can be achieved by a fusion draw apparatus or a double fusion draw apparatus and methods thereof.

In embodiments, the disclosed articles can be produced, for example, with a lamination apparatus for making the above mentioned glass enveloped laminate article, comprising:
  a slot extruder that extrudes a sheet of core; and
  at least one fusion draw isopipe that can, for example, surround, surmount, or otherwise cooperate with the slot extruder to deliver a glass layer to at least each face and at least two edges of the extruded core sheet.

In embodiments, the at least one fusion drawing isopipe comprises a single isopipe that delivers a glass layer to each face of the sheet of the core and each glass layer has the same glass composition.

In embodiments, the at least one fusion drawing isopipe comprises two isopipes that each deliver a glass layer to each face of the sheet of the core and each glass layer has a different glass composition.

In embodiments, if the core material can be delivered through a slot, then many options for making novel laminate and glass containing structures are accessible, since the core material can have a viscosity much lower than the clad glass, for example, the a clad glass of 200,000 poises.

In embodiments, the viscosity of the liquid (i.e., molten) glass clad in the double crucible apparatus can be, for example, less than about 50,000 poise.

In embodiments, the viscosity of the liquid core material in the double crucible apparatus can be, for example, from about 0.5 to 1,000 centipoise.

In embodiments, the disclosure provides a lamination apparatus for making the abovementioned enveloped article, comprising:
  a first crucible that extrudes a sheet of the core; and
  a second crucible surrounding the first crucible that delivers a glass envelope layer to each face and at least two edges of the sheet of the core to produce a laminate article, wherein the relative height of at least one or both of the first crucible and second crucible is vertically adjustable with respect to the other crucible.

In embodiments, the vertical adjustability of the relative height of at least one or both of the first crucible and second crucible regulates the relative flow and relative thickness, width, or both, of the core, and the relative flow and relative thickness of the glass envelope layer.

In embodiments, in the disclosed double crucible lamination apparatus, the first crucible, the second crucible, or both crucibles, can be made of platinum, or like heat and erosion resistant materials, and the first crucible, the second crucible, or both crucibles, can have an optional erosion protective quartz surface coating.

In embodiments, in the disclosed lamination apparatus can further comprise cooling or heating members for treating the newly laminated article, such as a heating or cooling wand, a heating or cooling roller, a heating or cooling fluid jet, or a combination thereof, situated on one or both of the major faces of the resulting laminate article.

In embodiments, the double crucible apparatus can have, for example, heating, cooling, or both heating and cooling capability, for regulating or adjusting the flow of the liquid core material. In embodiments, the double crucible apparatus can have, for example, valving or like mechanisms for regulating or adjusting the flow of the liquid core material through a gap or an orifice of the inner crucible.

In embodiments, in the combined slot draw and fusion draw apparatus the viscosity of the liquid glass clad can be, for example, of from about 200,000 to 400,000 poise.

In embodiments, in the combined slot draw and fusion draw apparatus, the viscosity of the liquid core material can be, for example, less than about 50,000 centipoise.

In embodiments, in the slot draw fusion draw apparatus, the core material can be other than a glass, for example, a thin layer of a metal, metalloid, or semiconductor material is delivered from a slot to between two viscoelastic liquid or like sheets of glass to form a glass envelope that surrounds (when viewed in cross-section) the core material.

In embodiments, the disclosed article can be prepared with an apparatus having a slot draw inside a fusion pipe, see for example, the perspective view of FIG. 3 and the cross-section view of FIG. 4B.

In embodiments, the disclosed apparatus provides additional design options, for example, the slot delivery aperture can be unobstructed or the slot delivery aperture can be compartmentalized or obstructed into a series of slits or holes. A compartmentalized slot aperture permits one to create or deliver structures other than a continuous core sheet. For example, when a hole geometry is selected for the slot, one can fabricate an array of hollow tubes or slots, or filled tubes or slots. Alternatively or additionally, hollow tube or slot structures can be combined, i.e., adjacent to or interspersed with filled tubes or slots. The hollow tubes or slots can subsequently be, for example, evacuated or filled with a fluorescent gas.

In embodiments, the "slot draw within a fusion pipe" apparatus mentioned in the commonly owned U.S. Pat. No. 7,514,149 PRIOR ART can have, for example, a continuous slot across the core width of the work piece.

In embodiments, the "slot draw within a fusion pipe" apparatus mentioned in the commonly owned U.S. Pat. No. 7,514,149 PRIOR ART can additionally be inventively modified as disclosed herein to have, for example, a discontinuous slot across the core width of the work piece, having for example, a plurality of separated slots or channels, and the plurality of separated slots or channels can each be selected or actuated to receive, for example, a molten or liquid core filling, a gas, or a combination thereof.

In embodiments, the "slot draw within a fusion pipe" apparatus can provide an unobstructed slot. Since the liquidus viscosity is not an issue in the slot draw, glasses, metals, or metalloids, that can have lower viscosities compared to clad glass can be selected for the core. Glasses, metals, metalloids, or combinations thereof, having lower viscosities can be, for example, a halide glass, an oxyhalide glass, a chalcogenide glass, and like glasses. Glass, metal, or metalloid cores, having a high refractive index, or optionally, additionally doped with rare earths, can be used to produce, for example, edge collector solar panels, rechargeable cell phone faces, and like devices.

In embodiments, the disclosed apparatus can provide a laminate having a metal core, a metalloid core, or semiconductor core. For a metal core layer or metalloid core layer, devices that employ properties like reflectance (e.g., for mirrors), magnetism, or conductivity (e.g., capacitors), can be made with the disclosed apparatus. For a semiconductor core layer an entirely new platform for integrated circuit design can be prepared, particularly if the core layer is, for example, a very thin single crystal. However, even an amorphous core structure or polycrystalline core structure can be useful. In the disclosed complete glass surround configuration, the glass clad layer can be selectively etched away or machined from one or both major faces or sides providing, for example, an option for a vertical (i.e., out-of-plane) architecture.

In embodiments, the disclosure provides a method of making a laminated sheet article having, for example, a semiconductor grade silicon core, and for example, one or more glass clad layer surrounding the core. The laminated sheet articles can be used as a platform for junction devices. The enveloped laminated sheet articles can be made in an apparatus that combines a slot draw for delivering a non-glass core, for example, a metal or a metalloid, and a fusion draw pipe for delivering the glass cladding to the core.

In embodiments, the disclosure provides a laminated sheet article and a method of making a laminated sheet article having, for example, a low melting glass core, for example, a halide, an oxyhalide, a chalcogenide, and like glasses, and for example, one or more glass clad layer surrounding the low melting glass core.

In embodiments, the core and the clad material pairings can have a comparable CTE or near CTE match.

In embodiments, the clad material can have a melt viscosity of at least 50,000 poise at from about 50 to 150° C., such as at about 100° C.

In embodiments, the disclosed apparatus and methods are advantaged by, for example, permitting the manufacture of new architectures for semiconductor devices.

In embodiments, for example, if silver or germanium is selected as the core material, then a fusion draw providing the glass clad layers and that operates at about 100° C. above the silver or germanium melting or softening points (e.g., 1050 to 1110° C.) is constructed and used for the lamination. The choice of the materials of construction for the clad draw can be, for example, fused silica, zircon, or alumina. However, these materials preferably should be tested for compatibility with respective core and glass melts. The configuration of the fusion pipe can be, for example, a hollow arrowhead, closed at both ends, with a slot cut half way across the tip. A separator barrier or tight fitting lid can be placed over the slot reservoir or chamber to separate from the delivered fusion glass. The slot can be, for example, wide enough so that surface tension will not impede flow and the head of the core liquid controls the delivery rate of the melt through the slot. The fusion drawn glass clad can have a liquidus of, for example, at least 200,000 poises at 1050° C., and have CTE compatibility or CTE difference of less than of from about $\pm 5 \times 10^{-7}$ compared to the core, and in semiconducting applications the fusion glass is preferably free of any alkali since alkalis can mix with and poison the semiconducting properties of the core material. In embodiments, if the CTE compatibility or CTE difference is more than of from about $\pm 10 \times 10^{-7}$ compared to the core, then shrinkage or weakening of the product enveloped laminate may be encountered.

In embodiments, the glass clad envelop preferably has one or more of the following: a compatible CTE; a melt viscosity compatible with the core material; and chemical compatibility, i.e., no adverse chemical reactions or chemical interactions.

Referring to the Figures, FIG. 1 shows a schematic in cross-section of an example PRIOR ART (see, for example, U.S. Pat. No. 4,214,886, to Shay) laminate structure (100) produced in a double fusion laminating apparatus having a core (110) and two adjacent clad layers (120) on each major face of the core.

Figure 5B:
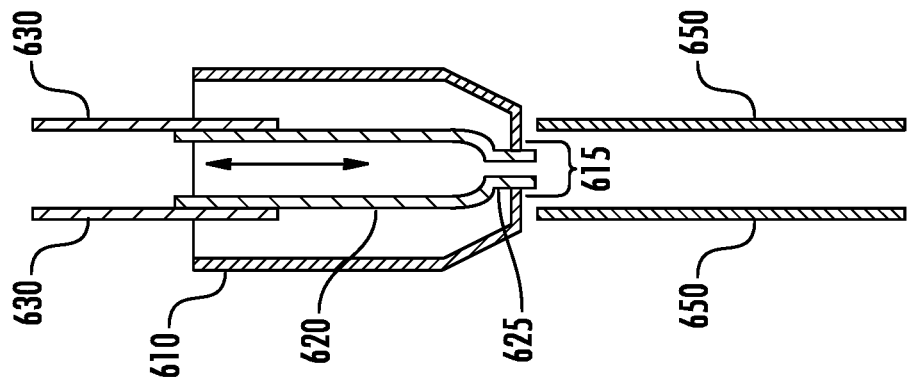
FIG. 5 shows a schematic in perspective of an example of the disclosed vertically adjustable double crucible slot draw laminating apparatus and cross section view 5A and 5B.
Figure 5A:
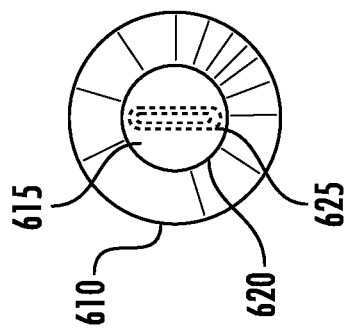
Figure 5:
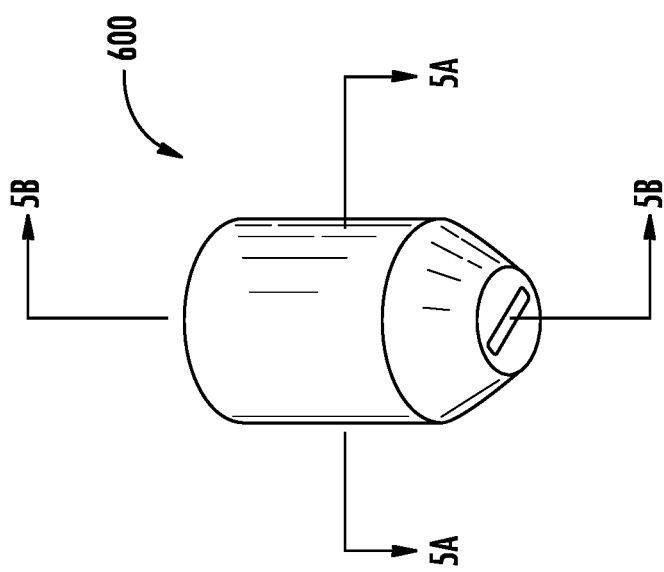

FIGS. 2A and 2B show schematic cross-section examples of disclosed laminate envelope structures and articles that can be produced in either of a double crucible laminating apparatus of FIGS. 5 and 6, or a combined slot draw and fusion draw apparatus of FIG. 3 and FIG. 4B. The article (200) of FIG. 2A has a core (210) that is fully enveloped in glass clad (220). FIG. 2B can have one or more cores (210) and each discontinuous core is fully enveloped in the glass clad (220). In embodiments, the article (250) of FIG. 2B can have one or more cores (210) that are fully enveloped in glass clad (220), and alternatively or additionally one or more cores (260) can be, for example, hollow or contain a gas.

FIG. 3 shows a schematic in perspective of an example a combined slot draw and fusion draw apparatus (300). The apparatus has at least one source of a molten or liquid metal or metalloid core (310) that can be delivered to a dispensing slot (312), at least one source of a molten glass clad (320) that can be delivered to, for example, an isopipe (311) that can produce split glass streams (325), which streams are recombined with the slot draw to envelop the core (315). An apparatus cross section 4B can be seen in FIG. 4B. Enveloped laminate (work piece and article) cross sections 2AB (2A and 2B) can be seen, for example, in FIG. 2A or 2B. In alternative embodiments, the combined slot draw and fusion draw apparatus of FIG. 3 can have at least one source of a solid metal such as a powder, pellets, chunks, and like solid forms, which solid can be conveyed to a tank, vessel, or reservoir within the interior of the apparatus (300) where melting can occur and the temperature can be controlled, prior to dispensing the liquid metal melt through the slot (312) or one or more of a plurality of slots.

FIGS. 4A and 4B show in cross-section the PRIOR ART double fusion apparatus (4A) and the PRIOR ART combined fusion draw and slot draw apparatus of U.S. Pat. No. 7,514,149, schematic of FIG. 3 (4B). FIG. 4A shows a schematic in cross-section of a PRIOR ART (see the above-mentioned U.S. Ser. No. 14/905,926 and U.S. Pat. No. 4,214,886), double fusion apparatus (400) and process having the clad glass stream (420) from an upper isopipe (410) streaming onto the core glass stream (440) from the lower isopipe (430) across the gap (450). FIG. 4B is a schematic (460) of cross-section 4B of the apparatus (300) perspective of FIG. 3, showing an isopipe (311) that conveys the split molten clad glass (325) streams to the core (315); and the slot (312) channel conveys liquid core material (475) from a reservoir or chamber (470), to the merger of the core and clad streams. In embodiments, the liquid core material (475) in the reservoir or chamber (470) can have a liquid or solid protective layer (not shown) on the top surface of the reservoir material such as $B_2O_3$. In embodiments, the tip of slot (312) channel can be adjusted or preselected to control or alter the thickness of the core stream relative to the clad streams. In embodiments, the tip of slot (312) channel can be, for example, square (flat), rounded, or tapered. In embodiments, the apparatus of FIGS. 3 and 4B can have optional thermal conditioning rollers (480) for the purpose of pulling or handling the enveloped laminate sheet article and not for quenching or nipping the sheet. In embodiments, the apparatus of FIGS. 3 and 4B can have an external convective (i.e., non-contact) cooling unit (not shown) such as a thermally conductive metal plate and a source of liquid or gaseous circulating coolant. In embodiments, a heating unit, cooling unit, or both, can be situated on one or both sides of the emerging enveloped laminate sheet article and can be advantageous, for example, for making a sheet article having a core with significant single crystal content (e.g., zone refining).

FIG. 5 shows a schematic in perspective of an example of the disclosed vertically adjustable double crucible slot draw laminating apparatus (600) and cross-sections 5A and 5B. Section 5A shows an outer crucible (610) having an first aperture (615) surrounds a second inner crucible (620) having a second aperture (625) that is smaller in length and width compared to the first aperture (615). Horizontal cross section 5B additionally shows the slot regions (615) and (620), thermal conditioning members (650), and arms or stems (630) for vertically adjusting the relative height between crucibles (610) and (620).

FIGS. 6A to 6D show views of the disclosed vertically adjustable double crucible slot draw laminating apparatus (600) perspective of FIG. 5. FIG. 6A shows one side elevation including adjustable stems (630) and section A-A. Section A-A also has detail area C for apertures (615) and (625), which is shown magnified in FIG. 6C. FIG. 6B shows another side elevation including one of a pair of exemplary adjustable stems (630) and section B-B. Section B-B also has slot detail area D, which is shown magnified in FIG. 6D.

Figure 7A:
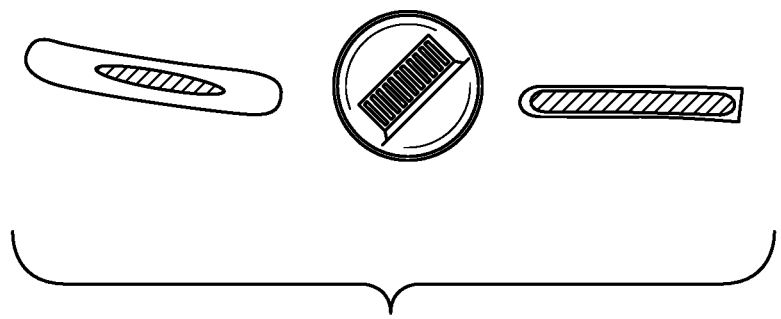
FIGS. 7A and 7B show images of two of the disclosed glass clad enveloped core samples having comparable outer dimensions and different core dimensions.

FIGS. 7A (end view) and 7B (side view), both show example images of two of the disclosed glass clad enveloped core samples having comparable outer dimensions, such as a fully enveloped (i.e., two faces and two edges or sides) glass (clad) and a metalloid (core) laminate each having a small (left) and a larger (right) germanium core, and a thick (left) or thin (right) glass envelope or glass surround about the core.

Figure 7B:
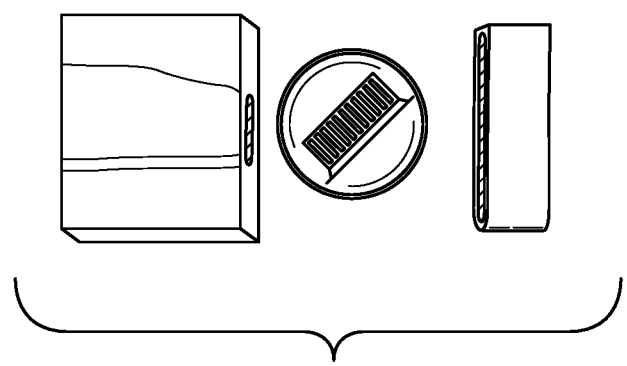

FIGS. 7A and 7B show images of two samples of a metalloid (core) and fully enveloped glass (clad) laminate having a germanium core and a glass envelope or glass surround (thick clad (left); thick core (right)). A U.S. Lincoln penny provides a scale reference.

Figure 8B:
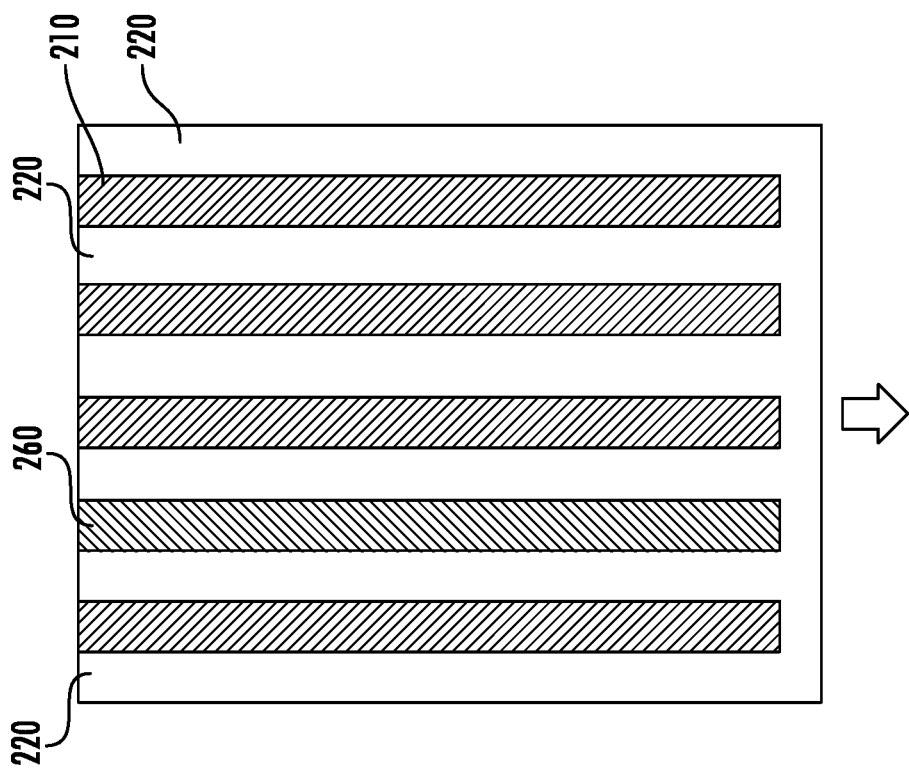
FIGS. 8A and 8B, respectively, show side or elevation views of the disclosed slot drawn-fusion sheets of FIGS. 2A and 2B.
Figure 8A:
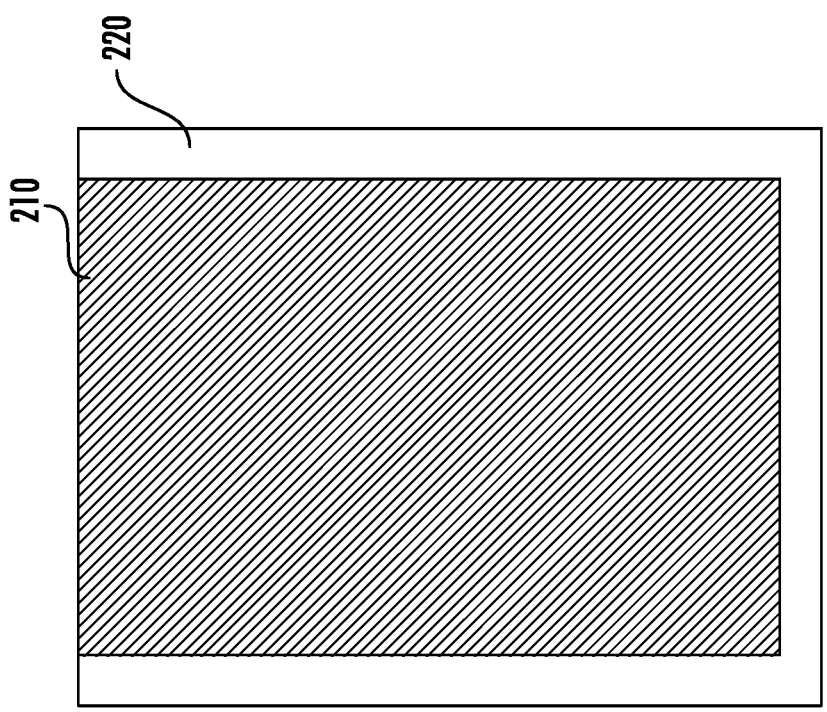

FIGS. 8A and 8B show elevation views of articles shown in the cross sections of FIGS. 2A and 2B, respectively, including FIG. 2A having a core (210) that is fully enveloped in glass clad (220). The article of FIG. 2B can have a plurality of discontinuous cores (210) that can be surrounded by or enveloped by glass (220), or one or more of the discontinuous cores (210) and one or more hollow core (260) or a core containing a gas (260). The block arrows indicate the sheet extrude and draw process direction, and the lead edge (fifth side) of the work piece. In embodiments, the clad envelope can be completed on the trailing edge of the work piece by, for example, cutting the continuous sheet or, for example, terminating the core flow while maintaining the clad flow for a brief period to produce a laminate sheet having a core that is fully enveloped or surrounded (i.e., on all six sides) by the clad glass.

EXAMPLES

The following Examples demonstrate making, use, and analysis of the disclosed lamination apparatus, laminate article, and methods in accordance with the above general procedures.

Example 1 (Prophetic)

Semiconductor Core Glass Glad Laminate

For semiconductor core delivery through a slot draw, silicon (MP 1412 C, expansion 26) is selected as the core. Example glasses selected for the clad layer are listed in Table 1A, and the glasses have a CTE that approximately matches (e.g., plus or minus about 10%) the CTE of the core. In embodiments, the clad glass is preferably alkali-free to avoid contaminating a semiconducting Si core. Table 1B lists examples of alkali-free clad glass compositions.

TABLE 1B

Alkali-free clad glass composition pairings for a silicon core laminate.

| Ingredient | Glass wt % | Glass wt % |
|---|---|---|
| $SiO_2$ | 80.3 | 77 |
| $Al_2O_3$ | 5.2 | 6 |
| $B_2O_3$ | 11.6 | 14.1 |
| CaO | 1 | 1.2 |
| BaO | 1.9 | 1.7 |

Example 2

Semiconductor Core Glass Glad Laminate

For semiconductor delivery through the slot draw, germanium (mp 938° C., coefficient of thermal expansion $5.9 \times 10^{-6}$/° C.) was selected for the core material. An example glass selected for the clad layer is listed in Table 2, and has a CTE that approximately matches (e.g., plus or minus 10%) the CTE of the core. In embodiments, the clad glass is preferably alkali-free to avoid contaminating a semiconducting core in the product article.

TABLE 2

Clad glass composition suitable for a germanium core and a glass clad laminate pair.

| Ingredient | Glass wt % |
|---|---|
| $Al_2O_3$ | 11.5 |
| $B_2O_3$ | 8.49 |
| CaO | 5.21 |
| MgO | 1.3 |
| SrO | 1.29 |
| $SiO_2$ | 62.89 |
| BaO | 3.91 |

Example 3 (Prophetic)

Semiconductor Core Glass Glad Laminate

For semiconductor delivery through the slot draw, GaAs (mp 1238° C., coefficient of thermal expansion $6.8 \times 10^{-6}$/° C.) is selected as the core material. Example glasses selected

TABLE 1A

Clad glass composition pairings for a silicon core laminate.

| Ingredient | Glass wt % | Glass wt % | Glass wt % | Glass wt % | Glass wt % | Glass wt % |
|---|---|---|---|---|---|---|
| $Al_2O_3$ | 20.58 | 19.48 | — | 3.24 | 4.81 | 20.55 |
| $B_2O_3$ | 3.55 | — | — | — | — | 3.47 |
| CaO | 0.03 | 0.04 | — | — | — | 0.034 |
| MgO | 1.51 | 2.77 | 6.53 | 5.12 | 4.44 | 1.51 |
| $As_2O_3$ | $5.0 \times 10^{-4}$ | — | — | — | — | $6.0 \times 10^{-4}$ |
| $SiO_2$ | 62.89 | 64.59 | 77.9 | 76.37 | 75.63 | 62.9 |
| BaO | — | — | — | — | — | — |
| $SnO_2$ | 0.14 | 0.23 | 0.24 | 0.24 | 0.24 | 0.14 |
| $ZrO_2$ | 0.01 | — | — | — | — | 0.013 |
| $Fe_2O_3$ | 0.012 | 0.02 | 0.0571 | 0.0571 | 0.0571 | 0.012 |
| $K_2O$ | $7.0 \times 10^{-3}$ | — | 15.27 | 14.97 | 14.82 | $6.0 \times 10^{-3}$ |
| $Na_2O$ | 11.38 | 12.85 | — | — | — | 11.34 |
| Cl | — | $1.0 \times 10^{-2}$ | — | — | — | — |
| $TiO_2$ | — | $1.0 \times 10^{-2}$ | — | — | — | — |
| $Cr_2O_3$ | — | — | $6.48 \times 10^{-4}$ | $6.48 \times 10^{-4}$ | $6.48 \times 10^{-4}$ | — |
| NiO | — | — | $1.2 \times 10^{-4}$ | $1.2 \times 10^{-4}$ | $1.2 \times 10^{-4}$ | — | for the clad layers are listed in Table 3A and have a CTE that approximately matches (e.g., plus or minus 10%) the CTE of the core. The GaAs core slot draw calls for overpressure to minimize evaporative Ga loss, e.g., 1,400 psi in the GaAs producing core system. The glass clad preferably can have a viscosity of 50,000 poise above the viscosity of the core and has a CTE difference within about $\pm 5 \times 10^{-7}$. In embodiments, the clad glass is preferably alkali-free or very low alkali content to avoid or minimize contaminating a semiconducting GaAs core. Table 3B lists two examples of low alkali clad glass composition pairings (Glass 1 and 2) that are compatible with the GaAs core.

TABLE 3A

Clad glass compositions suitable for pairing with a GaAs core laminate.

| Ingredient | Glass wt % | Glass wt % | Glass wt % |
|---|---|---|---|
| $Al_2O_3$ | 20.58 | 19.48 | — |
| $B_2O_3$ | 3.55 | — | — |
| CaO | 0.03 | 0.04 | — |
| MgO | 1.51 | 2.77 | 6.53 |
| $As_2O_3$ | $5.0 \times 10^{-4}$ | — | — |
| $SiO_2$ | 62.89 | 64.59 | 77.9 |
| BaO | — | — | — |
| $SnO_2$ | 0.14 | 0.23 | 0.24 |
| $ZrO_2$ | 0.01 | — | — |
| $Fe_2O_3$ | 0.012 | 0.02 | 0.0571 |
| $K_2O$ | $7.0 \times 10^{-3}$ | — | 15.27 |
| $Na_2O$ | 11.38 | 12.85 | — |
| Cl | — | $1.0 \times 10^{-2}$ | — |
| $TiO_2$ | — | $1.0 \times 10^{-2}$ | — |
| $Cr_2O_3$ | — | — | $6.48 \times 10^{-4}$ |
| NiO | — | — | $1.2 \times 10^{-4}$ |

TABLE 3B

Low alkali clad glass compositions for pairing with a GaAs core laminate.

| Ingredient | Glass 1 wt % | Glass 2 wt % |
|---|---|---|
| $SiO_2$ | 54.1 | 54.2 |
| $Al_2O_3$ | 6.01 | 6.03 |
| $B_2O_3$ | 31.81 | 31.92 |
| $P_2O_5$ | 7.74 | 7.14 |
| $Na_2O$ | 0.27 | 0.55 |
| $SnO_2$ | 0.16 | 0.16 |

The disclosure has been described with reference to various specific embodiments and techniques. However, many variations and modifications are possible while remaining within the scope of the disclosure.

What is claimed is:

1. A method of making a continuous laminate sheet, the continuous laminate sheet comprising: a core comprising at least one of an electrical semiconductor material, an electrical conductor material, or a combination thereof and a glass clad layer comprising a glass surrounding at least four of six sides of the core; the method comprising:
   continuously slot extruding a sheet of the core comprising a melt viscosity of from 0.01 centipoise to 5,000 centipoise when the core is slot extruded; and simultaneously
   continuously fusion drawing the glass clad layer onto at least four of six sides including both major sides of the sheet to produce the continuous laminate sheet having an envelope structure, the glass clad layer has a melt viscosity of from 30,000 poise to 400,000 poise when the glass clad layer is fusion drawn, and the glass clad layer has a CTE compatible with a material of the core.

2. The method of claim 1, further comprising:
   zone refining the continuous laminate sheet to increase a crystallinity of the core.

3. The method of claim 1, further comprising:
   rolling the continuous laminate sheet into a roll, or cutting the continuous laminate sheet into individual sheets.

4. The method of claim 1, wherein slot extruding is accomplished in a vacuum, in an inert atmosphere, under positive pressure, or a combination thereof.

5. The method of claim 1, wherein the core comprises at least one of Si, Ge, GaAs, or a mixture thereof; and
   the glass clad layer surrounding the core has a melt viscosity of from 30,000 poise to 400,000 poise when the glass clad layer is fusion drawn.

6. The method of claim 1, wherein:
   the core has a thickness of from 0.1 microns to 100 millimeters and a width of from 0.09 mm to 9.99 meters; and
   the glass clad layer surrounding the core has a thickness of from 0.1 to 1,000 microns, and a width of from 0.1 mm to 10 meters.

7. The method of claim 1, wherein:
   slot extruding is accomplished above a melting point of the core; and
   fusion drawing is accomplished above a melting point of the glass clad layer.

8. The method of claim 1, wherein the glass clad layer is an envelope completely surrounding the core on both major faces and on at least one edge or end.

9. The method of claim 1, wherein the glass clad layer is an envelope completely surrounding the core on both major faces and on all edges and ends.

10. The method of claim 1, wherein the glass clad layer is alkali-free.

* * * * *